US012645448B2

(12) United States Patent
Ezhilan et al.

(10) Patent No.: US 12,645,448 B2
(45) Date of Patent: Jun. 2, 2026

(54) AUTOMATED DETECTION AND PROPAGATION OF MULTI-SYSTEM LAUNCHES

(71) Applicant: Uber Technologies, Inc., San Francisco, CA (US)

(72) Inventors: Arunagiriswaran Ezhilan, Thoothukudi (IN); Srinivasan Hariram, Bangalore (IN); Amrut Bharat Joshi, Hyderabad (IN); Jeff Moore, Danville, CA (US); Jayaram Valliyur, Hyderabad (IN)

(73) Assignee: UBER TECHNOLOGIES, INC., San Francisco, CA (US)

( * ) Notice: Subject to any disclaimer, the term of this patent is extended or adjusted under 35 U.S.C. 154(b) by 250 days.

(21) Appl. No.: 18/501,634

(22) Filed: Nov. 3, 2023

(65) Prior Publication Data

US 2025/0147748 A1    May 8, 2025

(51) Int. Cl.
G06F 8/65        (2018.01)
G06F 9/38        (2018.01)
(Continued)

(52) U.S. Cl.
CPC .............. G06F 8/65 (2013.01); G06F 9/3838 (2013.01); G06F 9/5072 (2013.01); G06F 11/26 (2013.01)

(58) Field of Classification Search
CPC ........ G06F 8/65; G06F 9/3838; G06F 9/5072; G06F 11/26; G06F 8/60
(Continued)

(56) References Cited

U.S. PATENT DOCUMENTS 11,068,383 B2    7/2021  Davis et al.
2004/0117783 A1*  6/2004  Kaminsky ................. G06F 8/71
                                                    717/169

(Continued)

OTHER PUBLICATIONS

Bräuer, J. (Sep. 20, 2023). Automated Change Impact Analysis with Site Reliability Guardian. Dynatrace News. https://www.dynatrace.com/news/blog/site-reliability-guardian/ 8 pages.

(Continued)

*Primary Examiner* — Bradley A Teets
*Assistant Examiner* — Zengpu Wei
(74) *Attorney, Agent, or Firm* — Dority & Manning, P.A.

(57) ABSTRACT

Systems and methods for detecting and orchestrating the deployment of software changes. The system can access schema data indicative of a change associated with a first system, wherein executable code associated with the change is executable within a first computing environment. The system can determine a potential impact to a second system. The system can generate one or more computing tasks to notify the second system of the change and an acknowledgment placeholder with a unique identifier associated with the second system. The system can access data indicative of an execution status of the one or more computing tasks. The system can generate an update indicating that the one or more computing tasks have been executed by the second system. The system can transmit to the first system, data acknowledging the potential impact to the second system, and command instructions to deploy the executable code to a second computing environment.

20 Claims, 6 Drawing Sheets

(51) Int. Cl.
*G06F 9/50* (2006.01)
*G06F 11/26* (2006.01)

(58) Field of Classification Search
USPC ......................................................... 717/168
See application file for complete search history.

(56) References Cited

U.S. PATENT DOCUMENTS

| | | | |
|---|---|---|---|
| 2013/0212160 A1* | 8/2013 | Lawson ............. | G05B 19/0426 |
| | | | 709/203 |
| 2018/0365133 A1* | 12/2018 | Mitchell ................... | G06F 8/71 |
| 2019/0179631 A1* | 6/2019 | Benedetti ........... | G06F 9/44505 |
| 2020/0310779 A1* | 10/2020 | Van Heuklon ........... | G06F 8/65 |
| 2022/0171662 A1* | 6/2022 | Zhan ................... | G06Q 10/103 |
| 2023/0222470 A1* | 7/2023 | Wilson ................ | G06Q 20/102 |
| | | | 705/400 |

OTHER PUBLICATIONS

Dependency Impact Analysis in Software Testing and Development: What It Is and How to Do It (with Examples). (Jan. 26, 2022). Apriorit. https://www.apriorit.com/qa-blog/252-impact-analysis. 21 pages.

\* cited by examiner

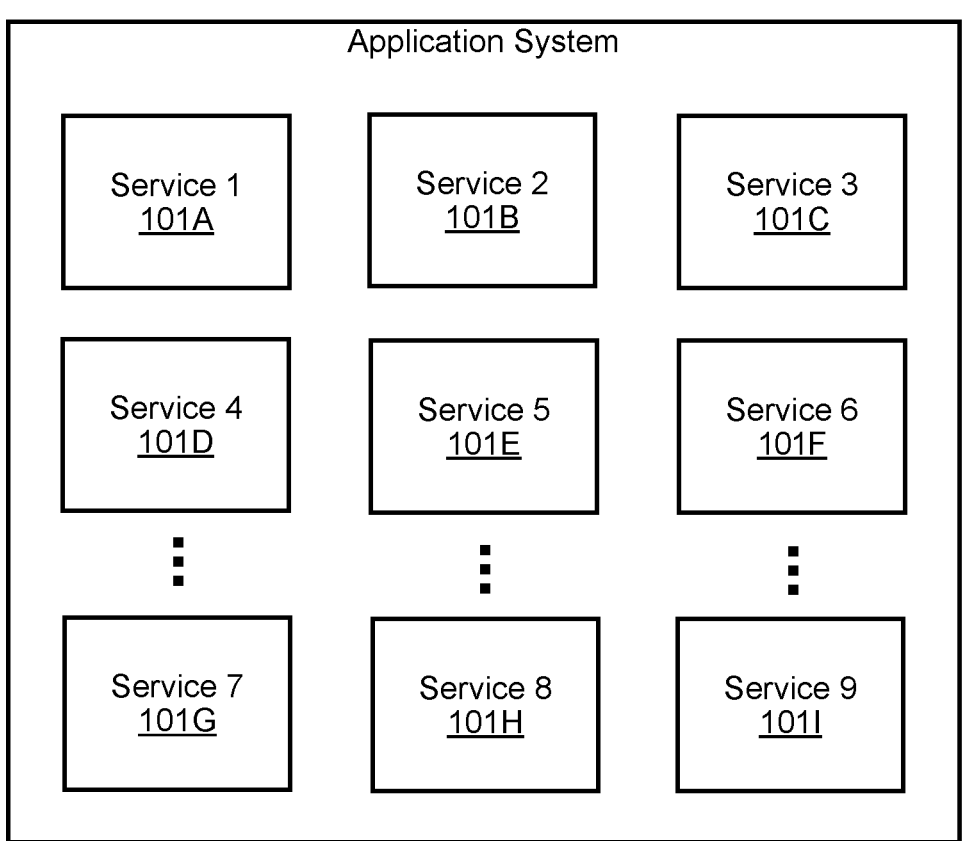
FIG. 1

500

---

502 — Accessing Schema Data Indicative of a Change Associated with a First System within a Multi-System Computing Architecture, wherein Executable Code Associated with the Change is Executable within a First Computing Environment

↓

504 — Determining, Based on the Schema Data, A Potential Impact to a Second System within the Multi-System Computing Architecture, the Potential Impact Arising from the Change Associated with the First System

↓

506 — Based on the Potential Impact to the Second System, Generating (i) One or More Computing Tasks to Notify the Second System of the Change and (ii) an Acknowledgement Placeholder wit a Unique Identifier Associated the Second System, the Acknowledgement Placeholder Being Stored within a Data Structure in Association with the Unique Identifier

↓

508 — Accessing, Over a Communication Channel Associated with the Second System, Data Indicative of an Executuion Status of the One or More Computing Tasks, wherein the Data Indicative of the Executuion Status os Associated with the Unique Identifier

↓

510 — Generating, Based on the Execution Status and the Unique Identifier, an Update to the Data Structure Storing the Acknowledgment Placeholder, the Update Indicating that the One or More Computing Tasks have been Executed by the Second System

↓

512 — In Response to the One or More Computing Tasks Being Executed by the Second System, Transmitting:

514 — i) To the First System, Data Acknowledging the Potential Impact to the Second System Arising from the Change Associated with the Fist System

516 — ii) One or More Command Instructions to Deploy the Executable Code Associated with the Change from the first Computing Environment to a Second Computing Environment

FIG. 5

AUTOMATED DETECTION AND PROPAGATION OF MULTI-SYSTEM LAUNCHES

FIELD

The present disclosure generally relates to orchestrating the testing and deployment of software changes.

BACKGROUND

Applications may include a plurality of interconnected and interdependent services. For instance, the services may communicate with each other to provide one or more capabilities for the application.

SUMMARY

Aspects and advantages of embodiments of the present disclosure will be set forth in part in the following description, or may be learned from the description, or may be learned through practice of the embodiments.

In an example aspect, the present disclosure provides an example computer-implemented method. The method includes accessing schema data indicative of a change associated with a first system within a multi-system computing architecture, wherein executable code associated with the change is executable within a first computing environment. The method includes determining, based on the schema data, a potential impact to a second system within the multi-system computing architecture, the potential impact arising from the change associated with the first system. The method includes, based on the potential impact to the second system, generating (i) one or more computing tasks to notify the second system of the change and (ii) an acknowledgment placeholder with a unique identifier associated the second system, the acknowledgement placeholder being stored within a data structure in association with the unique identifier. The method includes accessing, over a communication channel associated with the second system, data indicative of an execution status of the one or more computing tasks, wherein the data indicative of the execution status is associated with the unique identifier. The method includes generating, based on the execution status and the unique identifier, an update to the data structure storing the acknowledgement placeholder, the update indicating that the one or more computing tasks have been executed by the second system. The method includes, in response to the one or more computing tasks being executed by the second system, transmitting (iii) to the first system, data acknowledging the potential impact to the second system arising from the change associated with the first system. The method includes in response to the one or more computing tasks being executed by the second system, transmitting (iv) one or more command instructions to deploy the executable code associated with the change from the first computing environment to a second computing environment.

In some implementations, the first computing environment is associated with a test environment and the second computing environment is associated with a production environment.

In some implementations, outputting, one or more command instructions includes generating a request executable by a remote computing system, the request indicative of the change to be deployed in the second computing environment. In some implementations, outputting, one or more command instructions includes transmitting, the request to the remote computing system.

In some implementations, determining a potential impact to the second system includes accessing value data associated with one or more fields of a schema. In some implementations, determining a potential impact to the second system includes determining, based on the value data, one or more dependencies between the first system and the second system.

In some implementations, the method includes storing the one or more dependencies in a storage system.

In some implementations, the one or more dependencies includes at least one of direct dependencies or indirect dependencies.

In some implementations, the change associated with the first system includes at least one of (i) a service addition or service removal, (ii) an RPC (remote procedure call) addition or removal, (iii) a schema field addition or removal, (iv) a field value addition or removal.

In some implementations, the method includes outputting the one or more computing tasks to the second system.

In some implementations, the change includes one or more interface changes associated with the first system.

In some implementations, the one or more computing tasks includes one or more test scripts executable by the second system.

In some implementations, the method includes receiving one or more executed test scripts from the second system, wherein the one or more executed test scripts are associated with the one or more computing tasks. In some implementations, the method includes receiving one or more executed test scripts from the second system, wherein the one or more executed test scripts are indicative of test results associated with the potential impact of the change to the second system.

In some implementations, the method includes updating, based on the one or more executed test scripts, the execution status of the one or more computing tasks.

In some implementations, the method includes determining, based on the schema data, a potential impact to a third system within the multi-system computing architecture. In some implementations, the method includes, based on the potential impact to the third system, generating one or more computing tasks to notify the third system of the change and an acknowledgement placeholder with a unique identifier associated with the third system, the acknowledgement placeholder being stored within a data structure in association with the unique identifier. In some implementations, the method includes accessing, over a communication channel associated with the third system, data indicative of an execution status of the one or more computing tasks associated with the third system, wherein the data indicative of the execution status is associated with the unique identifier associated with the third system. In some implementations, the method includes generating, based on the execution status and the unique identifier, an update to the data structure storing the acknowledgement placeholder, the update indicating that the one or more computing tasks have been executed by the third system.

In some implementations, the method includes, in response to the one or more computing tasks being executed by the third system, outputting data acknowledging the potential impact to the third system arising from the change associated with the first system.

In another aspect, the present disclosure provides an example computing system. The example computing system includes one or more processors and one or more non-transitory, computer readable medium storing instructions that are executable by the one or more processors to cause the computing system to perform operations. The operations include accessing schema data indicative of a change associated with a first system within a multi-system computing architecture, wherein executable code associated with the change is executable within a first computing environment. The operations include determining, based on the schema data, a potential impact to a second system within the multi-system computing architecture, the potential impact arising from the change associated with the first system. The operations include based on the potential impact to the second system, generating (i) one or more computing tasks to notify the second system of the change and (ii) an acknowledgment placeholder with a unique identifier associated the second system, the acknowledgement placeholder being stored within a data structure in association with the unique identifier. The operations include accessing, over a communication channel associated with the second system, data indicative of an execution status of the one or more computing tasks, wherein the data indicative of the execution status is associated with the unique identifier. The operations include generating, based on the execution status and the unique identifier, an update to the data structure storing the acknowledgement placeholder, the update indicating that the one or more computing tasks have been executed by the second system. The operations include in response to the one or more computing tasks being executed by the second system, transmitting (i) to the first system, data acknowledging the potential impact to the second system arising from the change associated with the first system. The operations include in response to the one or more computing tasks being executed by the second system, transmitting (ii) one or more command instructions to deploy the executable code associated with the change from the first computing environment to a second computing environment.

In some examples, the first computing environment is associated with a test environment and the second computing environment is associated with a production environment.

In some examples, outputting, one or more command instructions includes generating a request executable by a remote computing system, the request indicative of the change to be deployed in the second computing environment. In some examples, outputting, one or more command instructions includes transmitting, the request to the remote computing system.

In some example operations, determining a potential impact to the second system includes accessing value data associated with one or more fields of a schema. In some example operations, determining a potential impact to the second system includes determining, based on the value data, one or more dependencies between the first system and the second system.

In some examples the operations include storing the one or more dependencies in a storage system.

In another example aspect, the present disclosure provides for one or more example non-transitory computer-readable media storing instructions that are executable to cause one or more processors to perform operations. The operations include accessing schema data indicative of a change associated with a first system within a multi-system computing architecture, wherein executable code associated with the change is executable within a first computing environment. The operations include determining, based on the schema data, a potential impact to a second system within the multi-system computing architecture, the potential impact arising from the change associated with the first system. The operations include based on the potential impact to the second system, generating (i) one or more computing tasks to notify the second system of the change and (ii) an acknowledgment placeholder with a unique identifier associated the second system, the acknowledgement placeholder being stored within a data structure in association with the unique identifier. The operations include accessing, over a communication channel associated with the second system, data indicative of an execution status of the one or more computing tasks, wherein the data indicative of the execution status is associated with the unique identifier. The operations include generating, based on the execution status and the unique identifier, an update to the data structure storing the acknowledgement placeholder, the update indicating that the one or more computing tasks have been executed by the second system. The operations include in response to the one or more computing tasks being executed by the second system, transmitting (i) to the first system, data acknowledging the potential impact to the second system arising from the change associated with the first system. The operations include in response to the one or more computing tasks being executed by the second system, transmitting (ii) one or more command instructions to deploy the executable code associated with the change from the first computing environment to a second computing environment.

Other example aspects of the present disclosure are directed to other systems, methods, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 1 depicts an example computing system according to example aspects of the present disclosure.

FIG. 5 depicts a flowchart diagram of an example method according to example aspects of the present disclosure.

DETAILED DESCRIPTION

Figure 2:
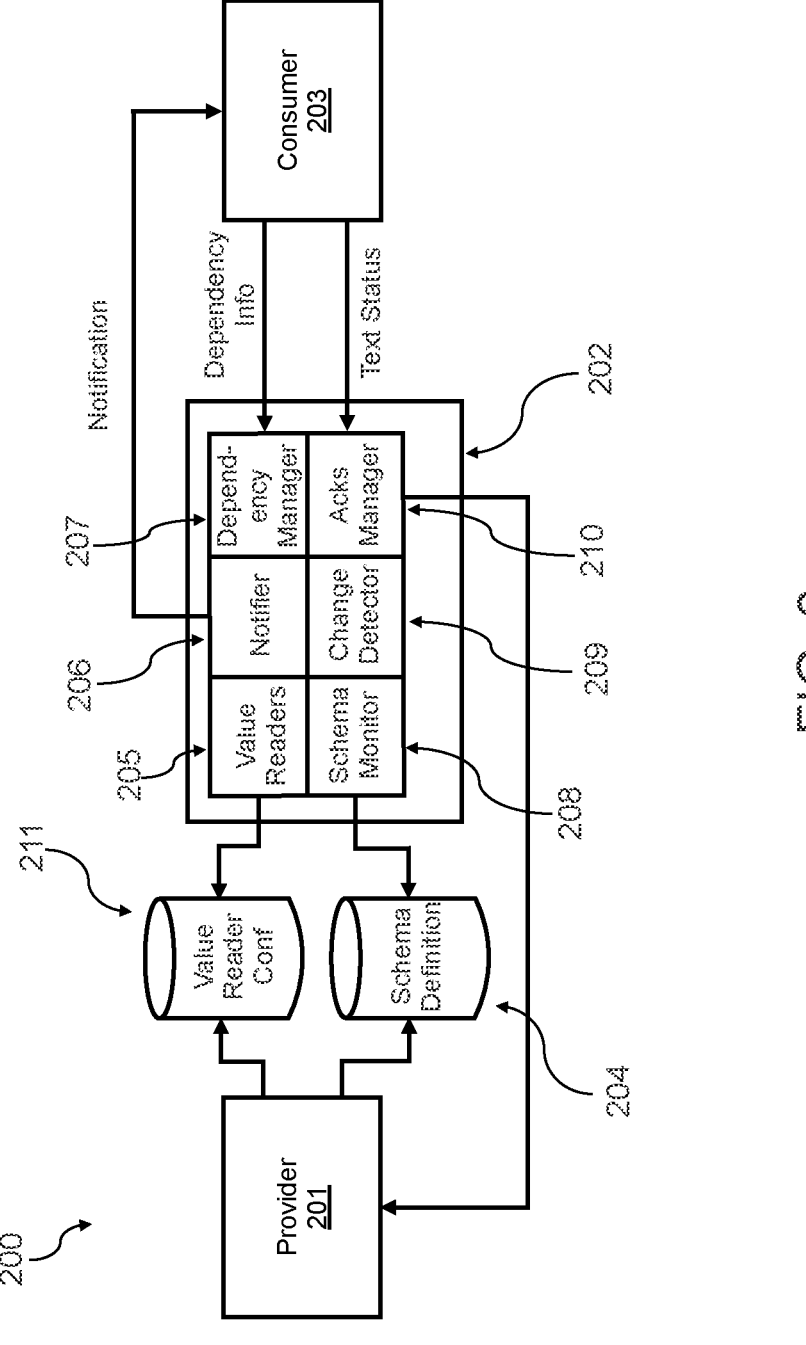
FIG. 2 depicts an example computing system according to example aspects of the present disclosure.

Generally, the present disclosure is directed to techniques for automatically detecting and reliably implementing programmatic changes across a plurality of computing systems. For example, techniques according to the present disclosure provide an improved change detection and implementation system across a plurality of systems using a multi-system launch service (MLS). The system of the present disclosure may more reliably detect an interface change associated with a system, determine whether the interface change will impact other (e.g., dependent) systems or services, and notify dependent system owners. The MLS may determine a detected change in a first computing environment (e.g., a test, QA (quality assurance), Dev (development), etc. environment) will impact dependent systems once deployed to a second environment (e.g., production environment, etc.) and initiate a workflow process to ensure that the change is tested by dependent systems in the first computing environment prior to the launch or deployment of the change in the second computing environment. For instance, the workflow process may include the generation of acknowledgement placeholders. Acknowledgement placeholders may be unique to a respective change and require dependent systems owners or custodians to acknowledge the change, test the respective dependent system, and confirm that the change will not adversely impact the dependent system.

For example, in a service oriented architecture (SOA), multiple systems or services may work together to execute various functions for a single application. Respective systems or services which make up the application system may be interconnected and dependent on a plurality of other systems to perform their respective functions. When a system requires a change, identifying downstream or dependent systems which may be adversely impacted may be a challenge due lack of visibility to other dependent systems, the complexity of the change, or coordination challenges across a plurality of systems and associated teams. Further, changes which are not properly tested by dependent systems, when implemented, may cause outages, performance issues, or other application impacts. To address this problem, the technology of the present disclosure allows system owners to automatically provide notice to all dependent system owners and validate testing of the change prior to the launch or deployment of the change.

According to example embodiments of the present disclosure, the MLS may include a schema monitor for monitoring schema definitions associated with a respective system. Operator interface schemas define the number and type of data sets which may be used as input or output for an operator associated with an interface of a system. For instance, dependent systems which interact with a field requiring a floating-point integer on an interface of another system may face issues if the field type is changed to a string value.

The schema monitor may detect schema changes by reading schema definitions in a schema repository and determine whether the schema change will impact other systems. For example, value readers may be used to retrieve values associated with fields in the schema. A change detector may read schema information and corresponding values from value readers to determine dependencies with other systems. For instance, the change detector may determine a change based on schema fields addition or removals, field value addition or removals, service addition or removal, etc. In some examples, a dependency manager may be used to track known dependencies between systems. In some examples, a detected schema change may be compared to a known dependency stored in the dependency manager to help determine a detected change will indeed impact other systems.

Once a determination is made that a detected change will impact other system(s), the MLS may initiate a workflow to notify dependent systems of the change. For instance, the MLS may include an acknowledgement manager configured to generate placeholder tasks associated with an acknowledgment of the change by respective impacted systems. The acknowledgement manager may generate an acknowledgement identifier (id) indicating a task for the respective impacted systems to indicate acknowledgement of the change. In some examples, the MLS may generate tasks for the impacted system owners to test the change within the impacted system. For instance, the MLS may generate test case tasks indicating that executed test scripts/cases are required to satisfy the acknowledgement placeholder.

The MLS may notify impacted or dependent systems of the change by communicating the acknowledgement placeholder and any test case placeholders to the preferred communication channel of the impacted system owners. For instance, the MLS may communicate messages, emails, or generate tasks to project management software associated with the impacted system owners. The impacted system owners may receive the acknowledgement placeholder, execute any necessary testing and provide a response to the MLS that the change has been acknowledged and tested. For instance, a status of the acknowledgement placeholder may be updated by the impacted system owner to indicate that the changes have been properly tested. Once all impacted systems have properly tested and acknowledged the change, the workflow may proceed to allowing deployment or launch of the change.

The technology of the present disclosure may provide several benefits and technical effects. For instance, the technology of the present disclosure automates and standardizes the process of launching new features or changes within an application to help teams launch faster. As such, the technology may increase the overall stability and reliability of the application system by limiting the probability of incidents or outages due to partial or incomplete testing of new features. The technology of the present disclosure may also help to increase the flexibility of application systems without impacting performance due to discovery of interface dependencies across a plurality of systems associated with an application. Moreover, by generating dependency data and change data, the technology of the present disclosure may improve the resolution of issues derived from system changes further increasing the stability and reliability of the application system.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations may be made to the embodiments without departing from the scope of the present disclosure. For instance, features illustrated or described as part of one embodiment may be used with another embodiment to yield a still further embodiment. Thus, it is intended that aspects of the present disclosure cover such modifications and variations. Moreover, the technology is described herein with reference to certain types of data for example purposes only and is not meant to be limiting. The systems and methods described herein can be implemented with security measures to help protect any data described herein from authorized access or use. When applicable data can be encrypted, scrubbed, etc. to protect associated information as well as provide opt outs for avoiding collection of certain data.

For example, the following describes the technology of this disclosure within the context of a service oriented architected (SOA) application system for example purposes only. As described herein, the technology described herein is not limited to an SOA application system and may be implemented for or within any application system architecture.

FIG. 1 depicts an example computing system according to example aspects of the present disclosure. The example application system 100 may include services 101A-I which communicate with each other to perform various functions for the application system 100. For instance, the services 101A-I may communicate using various protocols such as an enterprise service bus (ESB), remote procedure calls (RPC), messaging queuing protocols, etc. In some examples, the services 101A-I may be dependent on each other to perform respective functions for the application system 100. For example, the services 101A-I may include a plurality of interfaces which other services 101A-I rely on (e.g., dependent services 101A-I) to execute or exchange data. In some examples, services 101A-I may be directly dependent or indirectly dependent on one or more interfaces of a particular service 101A-I.

With respect to examples as described herein, the application system 100 may be implemented on a server, on a combination of servers, or on a distributed set of computing devices which communicate over a network such as the Internet. For example, the application system 100 may be distributed using one or more physical servers, virtual private servers, containers, cloud computing, etc. In some examples, the application system 100 may be implemented as a part of or in connection with the one or more clients (e.g., mobile application client, web browsing client, or desktop application client, etc.), where, for example, the one or more clients interact with one or more services 101A-I via a client-server relationship. For instance, a client may be deployed on a remote computing device that accesses one or more services 101A-I of the application system 100. In some examples, the clients may transmit requests (e.g., API requests, etc.) to interact with respective services 101A-I of the application system 100 over a network such as the internet.

In some examples, the application system 100 may be implemented using one or more containers (e.g., standalone software package for a software application) using a container service, or on VMs (virtual machines) within a shared network. A container service may be a cloud service that allows developers to upload, organize, run, scale, manage, and stop containers using container-based virtualization to orchestrate their respective actions. A VM may include virtual computing resources which are not limited to a physical computing device. For example, the services 101A-I may be deployed in containers controlled by a container orchestration service. In some examples, the container orchestration service may manage the computing resources of services 101A-I. For instance, the container orchestration service may determine the computing resource capacity of the service 101A, will be exceeded due to an increase in requests received and automatically scale the number of service instances (e.g., nodes) based on traffic or resource utilization.

The services 101A-I may include computer hardware or software which performs a specific function for the application system 100. For instance, the services 101A-I may include microservices (e.g., in a microservices architecture), application modules (e.g., in a monolithic architecture), or services (e.g., in a service oriented architecture). The services 101A-I may be included in any system architecture which allows computer processes to call each other to perform an action or function for the application system 100.

In some examples, the services 101A-I may include dedicated or shared computing resources within the application system 100.

By way of example, the application system 100 may be architected into a service-oriented architecture (SOA). A SOA may include an architectural design where services (e.g., services 101A-I) are self-contained and organized in a manner which logically represents repeatable computing processes for the application system 100. For example, a plurality of services 101A-I may be utilized to provide a service mesh for a particular capability of the application system 100. A service mesh may include dedicated infrastructure (e.g., computing resources) for orchestrating communications between respective services 101A-I of the service mesh. For example, service 101D and 101G may be included in a service mesh for providing financial reporting for the application system 100. For instance, service 101D may include software configured to aggregate total revenue for a geographic region whereas service 101G may include software configured to aggregate total expenses for the geographic region. As such financial reporting may routinely require that service 101D and service 101G communicate to exchange or update financial data. A service mesh may be used to facilitate the routine or frequent communication between service 101D and service 101G.

In some examples, service 101D and service 101G may be dependent on each other. For instance, service 101D and service 101G may include interfaces which allow for communication. Interfaces may include set definitions and protocols for communicating with a respective service 101A-I. By way of example, service 101D and service 101G may include application programming interfaces (APIs) and communicate with each other using APIs. For instance, service 101D and 101G may transmit API calls to each other to communicate or exchange data.

By way of example, service 101D may include an API endpoint "financial reporting" which allows other services (e.g., service 101G, etc.) to retrieve financial data using hypertext transfer protocol secure (HTTPS) protocol. In some examples, the API endpoint "financial reporting" may include a defined set of fields that return data types for an object (e.g., a revenue data object). For instance, a schema definition language may be used to specify the fields, field types, data types, etc., which are available on an interface for a service 101A-I. A revenue object associated with service 101D may include fields that represent different types of revenue. For example, revenue made from a ride sharing service and revenue made from a food delivery service may be associated with fields "ride_share" and "food_delivery" respectively on a revenue object.

A schema definition language may be used to define the interface of service 101D associated with the "financial reporting" endpoint. For instance, the schema may include one or more files which define the field for each type of revenue such that upon request from service 101G, all revenue fields (e.g., including "ride share" revenue and "food delivery" revenue) may be retrieved along with an associated value. Additionally, or alternatively, service 101G may indicate a specific revenue type (e.g., "ride share" revenue or "food delivery" revenue) to retrieve. In some examples, the interface may include various field types and data types which restrict the types of data (e.g., values) which may populate a field. For instance, revenue field types may be restricted to include only integer values reflecting dollar amounts.

Service 101G may transmit a request (e.g., API request, etc.) to service 101D to retrieve revenue data or exchange revenue data for expense data. For instance, service 101G may include an API endpoint "financial reporting" which allows other services (e.g., service 101D, etc.) to retrieve expense data using HTTPS protocol. Service 101D or service 101G may be a downstream service in a service mesh which aggregates revenue data and expense data to provide financial reporting functionality for the application system 100.

In some examples, dependencies may be identified based on the schema (e.g., defined field, data types, values, etc.) for a particular interface of a service 101A-I. By way of example, service 101D may include one or more functions (e.g., computing processes) to aggregate cost data retrieved from service 101G. The one or more functions may depend on an "expense" field consistently having a floating-point integer data type to be used as input to the function. For instance, a simple arithmetic function to subtract an expense value (e.g., dollar amount, integer, etc.) in an "expense field" from a revenue value (e.g., dollar amount, integer, etc.) may fail if the "expense" field is changed to include a text string. Services which directly depend on an interface to perform one or more functions are direct dependencies.

In some examples, indirect dependencies may be identified. For instance, service 101H, service 101I and service 101F may rely on the simple arithmetic function output to generate prices for service offerings. By way of example, service 101D may expose an endpoint which includes a "profit" field populated based on the output of the arithmetic function. Service 101H may include software configured to estimate a fare associated with a ride sharing service, service 101I may include software configured to estimate a delivery fee for a food delivery request, and service 101F may include software configured to generate a threshold bid for a freight delivery request. The "profit" data output by the arithmetic function may be retrieved from service 101D by interacting with an interface and used as input to one or more functions used to influence the fees or other costs associated with the respective service offerings associated with service 101H, service 101I, and service 101F respectively. In some examples, the dependency of service 101H, service 101I, and service 101F on service 101D may be an indirect dependency due to the downstream impact of an interface change.

In some examples, values associated with fields defined by the schema may indicate dependencies between services 101A-I. For instance, a set value for a field such as "service_name" may be a set value which other services 101A-I depend to access fields or data associated with the service 101A-I. By way of example, service 101A may include a field "service_name" and a value of "promotions" to indicate that the service 101A is associated with a promotional incentives service for users of the application system 100. Other services 101B-I may reliably communicate with service 101A by specifying the service name value (e.g., string) "promotions". In some examples, a change to a valid value relied on by other services 101A-I may cause adverse impacts to the dependent services (e.g., services 101B-I). As such, performance or other issues may arise when one or more services 101A-I change a valid value. In some examples, a detected change in a valid value may require impacted systems to acknowledge the change prior to implementing the change in a production or live environment. An example of detecting a valid value change associated with a service 101A-I (e.g., producer) and requiring acknowledgement of the value change by impacted services 101A-I (e.g., consumers) is further described with reference to FIGS. 2-5.

In some examples, when the owner of a service 101A-I updates or change one or more valid values used by other services 101A-I, a multi-system launch service (MLS) may monitor valid values associated with a particular service 101A-I using a value reader to detect changes which may impact other services 101A-I and notify the impacted services 101A-I. An example of a value reader is further described with reference to FIG. 5.

In some examples, the schema (e.g., schema files) associated with the services 101A-I may be stored in a shared repository or data store. For instance, schemas stored in a central or shared repository may allow services 101A-I to more easily communicate with one another. In some examples, a multi-system launch service (MLS) may access the shared repository to monitor for changes in respective schemas to determine changes which may impact other services 101A-I. For example, changes in a schema definition may indicate that that one or more fields has changed on the interface of a service 101A-I. An MLS, may determine, based on the respective schema definitions, if a proposed change to an interface for a service 101A-I will impact downstream services 101A-I. An example MLS is further described with reference to FIG. 5.

In other examples, the known dependencies between services 101A-I may be tracked to more efficiently determine whether a change to one or more of the services 101A-I will have an impact on other services 101A-I. For instance, the existence of a service mesh may indicate a known dependency due to the routine communications between a plurality of services 101A-I. In some examples, known dependencies such as those related to services 101A-I included in a service mesh may be stored to allow for tracking against changes in a schema, changes in valid values etc., to indicate other services 101A-I will be impacted by the change. In some examples, an MLS may include a dependency manager configured to manage known dependencies between services 101A-I. An example of tracking known dependencies using a dependency manager is further described with reference to FIG. 5.

FIG. 2 depicts an example computing system according to example aspects of the present disclosure. The example computing system 200 may include an MLS 202, providers 201, consumers 203, a value reader configuration data store 211, and a schema definition data store 204. In the example computing system 200, the MLS 202 may detect a change proposed by a provider 201 by accessing schema data (e.g., from the schema definition data store 204) and/or accessing valid values (e.g., from the value reader configuration data store 211). The MLS 202 may determine whether the change will impact a consumer 203, notify the consumer 203 of the change, and facilitate an acknowledgement workflow process to test the change prior to implementation.

The proposed change may be deployed in a first computing environment such as development (e.g., DEV), testing (e.g., TEST), staging (e.g., STG), quality assurance (e.g., QA) environments. For instance, a proposed change may be deployed in a sub-production environment as an initial step to properly test the change prior to deploying in a second computing environment (e.g., production or live environment). In some examples, the proposed change may be a code change made on one or more sub-production branches within a source code repository. For instance, a user may develop a change to an interface on a remote computing system (e.g., local host) and capture the change on a branch within the source code repository.

The provider 201 may include a service 101A-I which exposes an interface that is accessed or utilized by one or more consumers 203 (e.g., dependent services 101A-I). By way of example, service 101A (e.g., provider 201) may expose API endpoint 1, which is accessed by services 101B-C(e.g., consumers 203). In some examples, the provider 202 may propose a change to API endpoint 1 which is accessed by the consumers 203. For instance, the provider may initiate a change to deprecate API endpoint 1. The change may be deployed in a test (e.g., TEST) environment to allow for testing the remaining functionality of service 101A with the deprecated API endpoint 1.

In some examples, the consumers 203 (e.g., dependent services 101A-I) may be directly dependent or indirectly dependent on the API endpoint 1. For example, service 101B may access API endpoint 1, retrieve data for computing a new value (e.g., passthrough value), and expose an API endpoint consumed by service 101C with the computed value. In this example scenario, service 101B is directly dependent and service 101C is indirectly dependent on API endpoint 1. In some examples, services 101B-C may each access API endpoint 1. As such service 101B-C may both be directly dependent consumers 203. By way of example, direct dependencies may be readily identified using architecture diagrams, call tracing techniques, etc. Consumers 203 may include any service 101A-I or computer process which interacts with the interface of another service 101A-I or computer process.

The MLS 202 may include software running on one or more services of the application system 100. In some examples, the MLS 202 may be implemented on one or more servers remote from the application system 100. In other examples, the MLS 202 may run in the containers alongside the services 101A-I of the application system 100. For example, the MLS 202 may be implemented using one or more containers (e.g., standalone software package for a software application). For instance, the MLS 202 may be deployed using an orchestration service. The orchestration service may manage the computing resources across the MLS 202 to orchestrate the launch of changes of one or more services 101A-I within the application system 100.

The MLS 202 may include a number of subsystems and components for performing various operations. For example, the MLS 202 may include value readers 205, a notification system 206, dependency manager 207, schema monitor 208, change detector 209, and an acknowledgment manager 210.

The schema monitor 208 may include software configured to read schema definitions for services 101A-I of the application system 100. For instance, the schema definitions (e.g., files which define the interface for a service 101A-I) may be stored in the schema definition data store 204. In some examples, system administrators or custodians for the respective services 101A-I may create and maintain the schema definition data store 204. The schema definition data store 204 may include centralized or distributed storage. The schema definition data store 204 may be implemented on a server, on a combination of servers, or on a distributed set of computing devices which communicate over a network such as the Internet. For instance, the schema definition data store 204 may be implemented on one or more nodes with respective services 101A-I such that the schema definitions are readily available.

In some examples, the schema definition data store 204 may be a distributed file system that allows the MLS 204 to access files storage from multiple hosts through a computer network. For example, the schema monitor 208 may access one or more schema definitions stored in the schema definition data store 204. The schema monitor 208 may be configured to decode schema formats such as protocol buffers (e.g., defined communication protocols). In some examples, the schema monitor 208 may be configured to detect schema changes that are part of a multi-system launch (e.g., change that will impact other services 101A-I). For example, the schema monitor 208 may detect changes in schemas associated with services 101A-I by comparing detected changes in a stored schema definition with the schema definition read by the schema monitor 208. The detected changes may trigger a workflow to provide the changed schema definitions to the change detector 209.

In some examples, the schema definition data store 204 may include schema data for each computing environment of the consumer 201 (e.g., service 101A-I). For instance, the schema definition data may include schema definitions for a first computing environment (e.g., DEV, STG, QA, TEST, etc.) to detect changes prior to being deployed in a second computing environment (e.g., PRD, etc.).

The value readers 205 may include software configured to read valid value information for the fields in the schema definitions for respective services 101A-I. For instance, the schema definitions for a service 101A-I may include defined fields and valid values that are relied upon by other services 101A-I to access the service 101A-I or interact with data. The valid values may be stored in a value reader configuration data store 211. In some examples, system administrators or custodians for the respective services 101A-I may create and maintain the valid value configuration data store 211. The valid value configuration data store 211 may include centralized or distributed storage. The valid value configuration 203 may be implemented on a server, on a combination of servers, or on a distributed set of computing devices which communicate over a network such as the Internet. For instance, the valid value configuration data store 211 may be implemented on one or more nodes with respective services 101A-I so the schema definition including the defined values are readily available. In some examples, the valid value configuration data store 211 may be included within the schema definition data store 204. For instance, the valid value configuration data store 211 and schema definition data store 204 may be included in a centralized storage system maintained by respective owners or system custodians for respective services 101A-I.

In some examples, the valid value configuration data store 211 may be a distributed file system that allows the MLS 204 to access files storage from multiple hosts through a computer network. For example, the value readers 205 may access valid value information stored in the valid value configuration data store 211. The value readers may be configured to read value information from the fields in the schema definition for respective services 101A-I. In some examples, the value readers 205 may be reused. For instance, the value readers 205 may be configured to read valid values for different fields on an interface that use the same access mechanisms (e.g., two different fields store their valid value sets in a configuration store). The value readers may be configured to read the configuration store based on the configuration store parameters. For instance, the configuration may be included with the schema definition and be decoded using extensions to schema formats such as protocol buffers.

In some examples, the valid value configuration data store 211 may include value data for each computing environment of the consumer 201 (e.g., service 101A-I). For instance, the value data may include valid values for a first computing environment (e.g., DEV, STG, QA, TEST, etc.) to detect changes prior to being deployed in a second computing environment (e.g., PRD, etc.).

The MLS 202 may determine, based on the schema definition (e.g., schema data) for a first service, a potential impact to a second service within the application system 100. For instance, the MLS 202 may include a change detector 209 configured to read schema data from the schema monitor 208. The change detector 209 may include software running on one or more servers within the MLS 202. In some examples, the change detector 209 may be configured as a workflow which may be triggered automatically (e.g., scheduler, dynamically, etc.) to process one or more schemas to determine whether a change had been proposed for a respective schema definition for a service 101A-I. In some examples, the change detector 209 may be manually initiated. For instance, system owners or custodians for respective services 101A-C can directly send change information to the change detector 202 for planned or upcoming changes.

In some examples, the MLS 202 may determine, based on value data (e.g., valid values) for a first service, a potential impact to a second service within the application system. For instance, the change detector may be configured to read schema data and valid valued (e.g., value data) from the value readers 205. A change in the schema definition or valid values may indicate a change to the interface of a respective service 101A-I. For example, the change detector may be configured to determine, based on the schema data and/or value data, changes such as the addition or removal of a service (e.g., service 101A-I), the addition or removal of a remote procedure call (RPC) (e.g., new or deprecated endpoints, etc.), the addition or removal of schema fields (e.g., fields on an interface), the addition or removal of field data values, etc.

By way of example, the MLS 202 may include a dependency manager 207 which maintains information about dependencies between services 101A-I. The dependency manager 207 may include software running on one or more servers with the MLS 202. The dependency manager may maintain dependencies at the interface level, system level, etc. In some examples, the dependency manager 207 may set up direct and indirect dependencies. For instance, the dependency manager 207 may identify direct dependencies based on dependency data provided by respective owners or custodians for services 101A-I, call tracing, or other techniques. Indirect dependencies may be identified by using passthrough value reader configuration. For instance, values passed through to downstream services 101A-I may indicate indirect dependencies. The direct and indirect dependency data may be stored and maintained in the dependency manager 207.

The MLS 202 may analyze change data associated with a detected change by a first system from the change detector 209 and determine, based on dependency data within the dependency manager 207, a potential impact for a second system (e.g., consumer 203). For instance, the MLS 202 may compare the change (e.g., interface change, system change, etc.) to the dependency data to determine other services 101A-I which will be directly or indirectly impacted by the change. In some examples, the multi-service launch system 202 may determine granular level changes based on the schema data and the value data. For instance, field level changes detected in a schema definition or values (e.g., passthrough values, etc.) within fields in a schema definition may be detected and compared against dependency data to determine potential granular level impacts to consumers 203.

In some examples, the MLS 202 may determine a plurality of changes associated with a plurality of services 101A-I. For instance, multiple services 101A-I may propose changes simultaneously. The MLS 202 may determine, based on the concurrent changes, the potential impacts to other services 101A-I for each of the concurrent changes. In other examples, the MLS 202 may determine there are not impacted consumers 203 of the change.

The MLS 202 may generate, based on the potential impact to consumers 203 (e.g., second systems), one or more computing tasks to notify the consumers 203 of the change and an acknowledgment placeholder with a unique identifier associated with the consumer 203. For instance, the MLS 202 may include a notification system 206 and an acknowledgment manager 210. The acknowledgement manager 210 may include software running on one or more servers within the MLS 202. The acknowledgement manager 210 may be configured to trigger the generation of an acknowledgement placeholder. An acknowledgement placeholder may include a record or file indicating a change which has a potential impact on one or more consumers 203.

By way of example, when the change detector 209 detects changes to an interface, the change information along with dependency information may be passed to the acknowledgment manager 210. Based on this information, the acknowledgment manager 210 may generate an acknowledgment placeholder with a unique identifier (id) for each dependent (e.g., directly dependent and indirectly dependent) service 101A-I. In some examples, the acknowledgment placeholder may include a status of an acknowledgment workflow using the unique ids. In some examples, the acknowledgment placeholder may be stored within a data structure in association with the unique identifier. For instance, the acknowledgment placeholders may be stored in local storage within the MLS 202 or a remote storage system.

The acknowledgement placeholders, using the unique ids may be used to track the status or progress of respective consumers 203 (e.g., dependent systems) testing the change prior to implementation of the change by the producer 201 (e.g., first system). For instance, the MLS 202 may generate one or more computing tasks to notify the consumers 203 of the change. The one or more computing tasks may include tasks for respective system owners or custodians of the consumers 203 (e.g., dependent services 101A-I) to test the proposed changes by the provider. For instance, the one or more computing tasks may include test scripts to be executed by consumers 203 to ensure that the proposed change will not have an adverse impact. Test scripts may indicate specific functionality or processes to be tested by the consumer 203. For example, a change that will deprecate an API endpoint may be associated with a computing task (e.g., test script) which tests the functionality of the consumer 203 in a scenario where it may not call the deprecated API endpoint.

In some examples, the MLS 202 may track the status of the computing tasks to determine whether the testing has occurred for the change. For instance, the MLS 202 may include a notification system 206 configured to generate and transmit notifications to respective system owners or custodians of the consumers 203. The notification system 206 may include software running on one or more servers of the MLS 202. In some examples, the notification system may generate and transmit notifications including computing tasks (e.g., test scripts), etc. to consumers 203. In some examples, the notifications may be transmitted to a preferred notification channel of the consumer 203. For instance, the notification system 202 may transmit notifications to an email, project management tools, messaging channels, etc. For example, newly onboarded services 101A-I may provide communication preferences upon onboarding to the MLS 202.

In some examples, respective owners or custodians of consumers 203 may respond to the notifications. For instance, as consumers 203 execute the test scripts, consumers 203 may respond to an email notification, update a task in a project management tool, enter a status update in a messaging system, etc., to indicate an updated status on the computing task. The response to the notification (e.g., using the unique ids) may update the status of the acknowledgement placeholder.

By way of example, the MLS 202 may receive a response to the notification indicating one or more executed test scripts (e.g., executed computing tasks) from the consumer 203 (e.g., second system). The one or more executed test scripts may indicate test results associated with the potential impact of the change to the consumer 203. For instance, consumers 203 may test the change on their respective service 101A-I and determine there are no adverse impacts. As such, the executed tests scripts may indicate a "pass" execution status. In some examples, the consumer 203 may test the change and determine one or more changes local to the consumer 203 are required to avoid adverse impacts from the change. In some examples, the consumer 203 may implement one or more local changes and provide an executed test script indicating a "pass" execution status. In other examples, the one or more local changes may not be immediately implemented. As such the consumer 203 may provide an executed test script indicating a "failed" execution status.

In some examples, a "failed" execution status may indicate that the provider 201 may not proceed with deploying the change in production (e.g., the second computing environment). For instance, the MLS 202 may update, based on the one or more executed test scripts, the execution status of the one or more computing tasks. The acknowledgement manager 210 may be configured notify the provider 201 of "failed" execution statistics for all computing tasks. In some examples, the acknowledgement manager 210 may be configured to notify the provider once all computing tasks have a "pass" execution status for all computing tasks.

In some examples, consumers 203 may require one or more local changes to accommodate or avoid adverse impacts for a producer 201. For example, the one or more local changes may require interface or system changes which impact other services 101A-I. A consumer 203 may make one or more local changes on a sub-production branch and commit that branch to a source code repository to test the one or more local changes. In some examples, the consumer 203 may test the one or more local changes to obtain a "pass" execution status for the proposed change. The MLS 202 may be configured to receive a response automatically, based on a consumer 203 testing one or more local changes in a source code repository. An example of one or more local changes being tested against code within a source code repository is further described with reference to FIG. 3.

In some examples, a first consumer (e.g., second system) may be directly dependent on an interface of a producer (e.g., first system) where a change was detected and a second consumer (e.g., third system, etc.) may be indirectly dependent on the change because of a dependency on the first consumer (e.g., second system). As such, the MLS 202 may detect one or more local proposed changes for a producer (e.g., first system), determine an impact to a directly dependent consumer (e.g., second system) and an impact to an indirectly dependent consumer (e.g., third system), and orchestrate a second notification and acknowledgement workflow to cause the downstream services 101A-I to additionally test the proposed change and the one or more local changes. For instance, the MLS 202 may generate a parent-child relationship with the acknowledgement placeholder associated with the first consumer (e.g., second system) and the acknowledgement placeholders associated second consumer (e.g. third system). In some examples, a provider 201 will not be able to proceed with the proposed change until each of the acknowledgement placeholders for the first consumer and second consumer have been satisfied. In other examples, the MLS 202 may provide a notification of widespread impacts associated with a proposed change to the producer 201. For instance, the owner or system custodian may have an opportunity to evaluate the efficacy of the proposed change or terminate the proposed change based on data indicating the widespread impacts.

In some examples, the first consumer (e.g., second system) and second consumer (e.g., third system) may both be directly dependent on the interface where a change was detected. As such, the MLS may orchestrate a first and second notification and acknowledgement workflow to cause the first consumer (e.g., second system) and second consumer (e.g., third system) to respectively test the proposed change. In some examples, a provider 201 will not be able to proceed with the change until both the first consumer and second consumer have tested and acknowledged the change.

Figure 3:
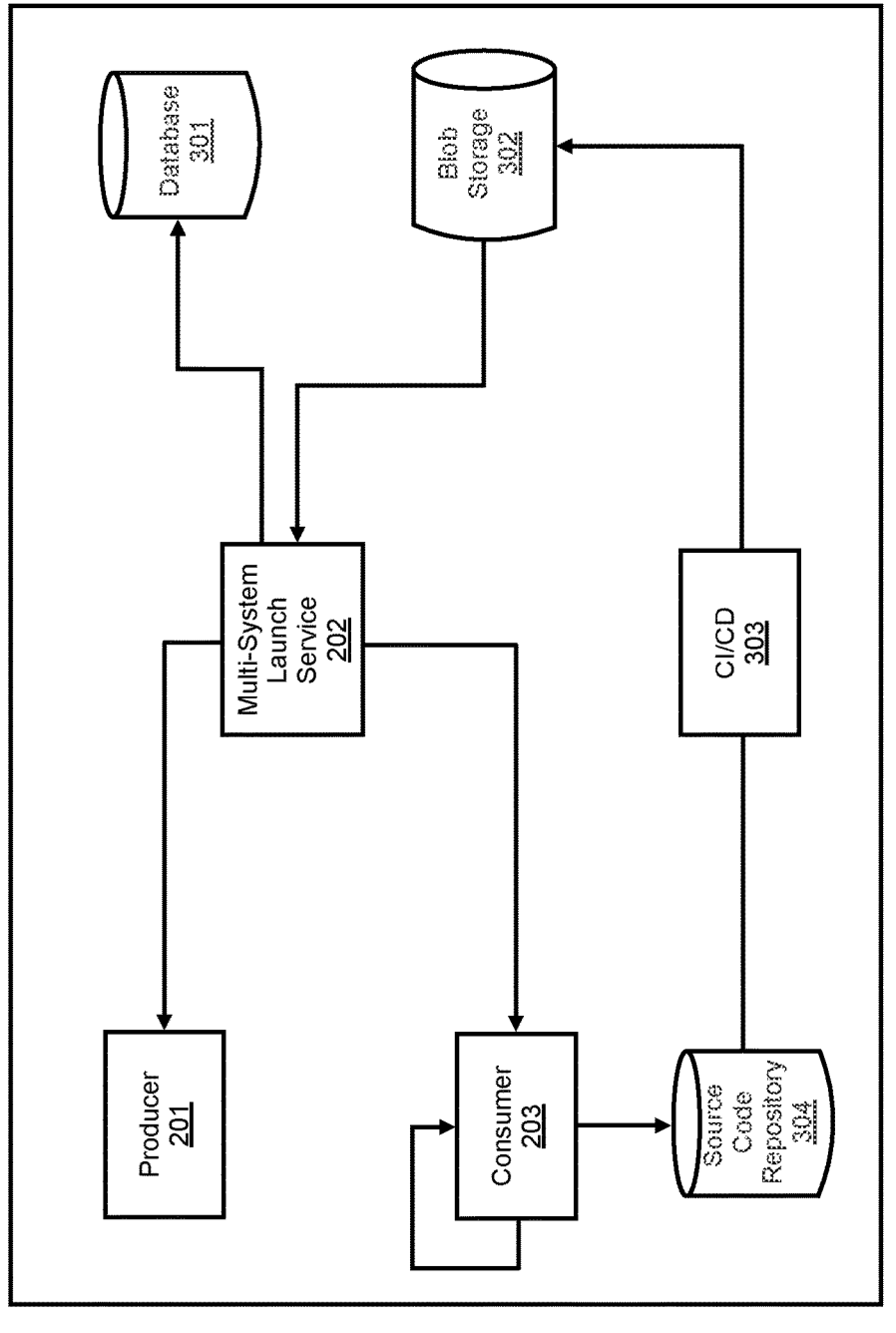
FIG. 3 depicts an example dataflow pipeline according to example aspects of the present disclosure.

FIG. 3 depicts an example dataflow pipeline according to example aspects of the present disclosure. The following description of dataflow pipeline 300 is described with an example implementation in which the MLS 202 detects a change associated with a producer 201 and automatically updates the execution status of acknowledgement placeholders based on consumers 203 testing the change using continuous integration/continuous delivery (CI/CD).

The MLS 202 may automatically detect proposed changes by a producer 201. For instance, the MLS 202 may periodically poll the schema definition data store 204 and/or value reader configuration data store 211 to detect changes. Once the MLS 202 determines a change will impact a consumer 203, an acknowledgement placeholder may be generated and stored in a database 301.

The database 301 may include any type of data storage such as cloud storage, HDD (hard disk drives), object storage, block level storage, etc. In some examples, the database 301 may be remote from the MLS 202. In some examples, the database 301 may be implemented on one or more servers of the MLS 202.

In some examples, the database 301 may be configured to store acknowledgement placeholders generated by the MLS 202. For instance, the database 301 may include database tables (e.g., rows and columns), linear data structures (e.g., arrays, linked lists, etc.), tree data structures (e.g., connected nodes), etc., which store acknowledgement placeholders and concatenate one or more computing tasks.

The MLS 202 may notify the consumer 203 of the change and the consumer may make one or more local changes. For instance, the consumer 203 may determine the change requires one or more code changes to the service 101A-I. In some examples, the consumer 203 may update the source code for the service 101A-I in a sub-production branch and commit (e.g., upload) the branch including the one or more code changes to a source code repository 304.

The source code repository 304 may include any location where code and other software development assets are stored. For instance, the source code repository 304 may include documentation for the source code, test scripts, archived code, and various versions of the software for the service 101A-I. In some examples, the source code repository may include a plurality of branches. For instance, a consumer 203 may run an instance of their software in a plurality of computing environments (e.g., DEV, STG, PRD) etc. In some examples, the respective branches may correspond with the various computing environments. By way of example, a master branch or main branch may correspond to a production computing environment, whereas a development or test branch may correspond to a development or sub-production environment.

In some examples, the various branches may allow for testing changes to the source code of a service 101A-I without impacting the live version of the consumer 203 in a production environment. For example, the consumer 203 may execute the one or more computing tasks (e.g., test scripts) on a test branch within the source code repository 304. In some examples, a CI/CD system 303 may run the code from the test branch (e.g., including the one or more code changes) to execute the test scripts. A CI/CD system 303 may include software configured to automate the testing of software changes. For instance, the CI/CD system 303 may be a remote system configurated to detect new changes committed to a branch within the source code repository 304 and run the changes against a series of predefined checks or test to quickly determine whether the one or more code changes meet a threshold criteria to be deployed in a production (e.g., second) computing environment. By way of example, the CI/CD system 303 may test the one or more code changes to determine whether any vulnerabilities exists.

The CI/CD system 303 may be configured to execute specific test cases. For instance, CI/CD pipelines may be configured based on the one or more computing tasks to specifically test functionality associated with the proposed change. In some examples, the CI/CD pipeline may be configured to automatically acknowledge the change (e.g., provide a status update) once the change has been merged to the master branch (e.g., production branch, main branch, etc.). Once the CI/CD system executes the one or more code changes and the change passes (e.g., "passed" execution status) the defined tests, a test report may be transmitted to a blob storage system 302, where the test results may be processed and provided to the MLS 202. The blob (binary large object) storage system 302 may include storage for unstructured data. For instance, the blob storage system 302 may store data in any file format in a non-hierarchical manner (e.g., data lakes, data warehouses, etc.)

The MLS 202 may retrieve over one or more networks (e.g., internet, etc.) the execution status for computing tasks from the blob storage system 302 and update the acknowledgement placeholder 301. For instance, the MLS 202 may read test results (e.g., via a communication channel over one or more networks) from the blob storage system 302. The test results may be associated with the one or more computing tasks (e.g., test scripts, etc.). In some examples, the MLS 202 may associate the one or more executed computing tasks with the unique id of the acknowledgement placeholder and update the execution status to indicate the test results.

Figure 4:
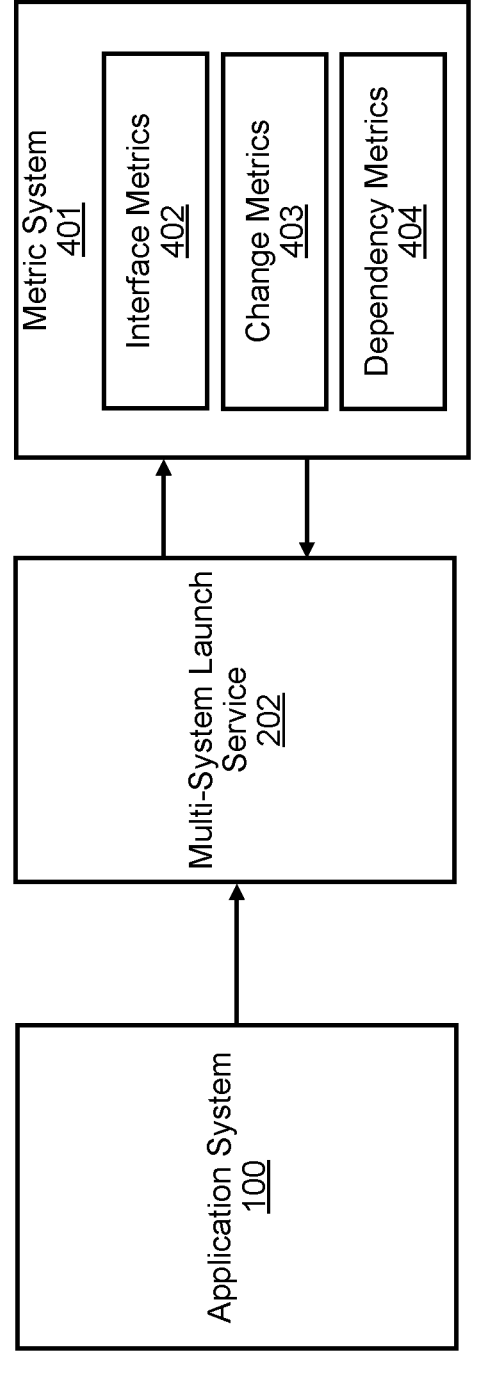
FIG. 4 depicts an example computing system according to example aspects of the present disclosure.

FIG. 4 depicts an example computing system. The example computing system 400 may include the application system 100, the MLS 202 and a metrics system 401 con-figured to capture and report metrics associated with the application system 100. In some examples the metrics system 401 may provide guardrail metrics for the MLS 202.

For example, as the MLS 202 facilitates the launch of new changes for services 101A-I of the application system 100, the MLS 202 may emit metrics to a metrics system 401. The metrics system 401 may include software configured to manage data. For instance, the metrics system 401 may include analytics capabilities to analyze metrics emitted by the MLS 202. As such, the metrics system 401 may include one or more data stores to store and organize metrics emitted by the MLS 202. In some examples, the metrics system 401 may include a user interface to visualize metrics associated with the MLS 202.

The metrics system 401 may be implemented on one or more servers of the MLS 202, one or more servers of the application system 100, one or more remote servers or any combination thereof. In some examples, the metrics system 401 may be configured to manage interface metrics 402, change metrics 403, and dependency metrics 404.

Interface metrics 402 may indicate a completeness of interface definitions available to the MLS 202. For instance, the metrics system 401, may determine the interface completeness for respective services 101A-I by identifying the percentage of fields which do not have any value reader configuration attached to them. By way of example, fields which do not have any associated value readers may indicate an incomplete mapping of fields or interfaces for a service 101A-I.

In some examples, the metrics system 401 may track change metrics 403. Change metrics 403 may include metadata associated with pending or completed changes. For instance, change metrics may include data indicating the average time to deploy a change, average time to test changes at the service 101A-I level, missed change detections, historical trends for changes, etc. In some examples, the change metrics 403 may be determined by analyzing the acknowledgement placeholders and computing tasks associated with respective changes.

In some examples, the metrics system 401 may track dependency metrics 404. Dependency metrics 404 may include dependency completeness of the application system 100. For instance, the MLS 202 may miss detecting proposed changes which may impact other services 101A-I if a complete mapping of dependencies is not obtained. In some examples, the metrics system 401 may determine dependency metrics by calculating the percentage of the dependencies which are not at granular field level.

The metrics system 401 may provide interface metrics 402, change metrics 403, and dependency metrics 404 to the MLS 202. For instance, the MLS 202 may utilize the metrics from the metrics system 401 to automate the detection and notification of changes. By way of example, the MLS 202 may determine, based on dependency metrics 404 that there is insufficient dependency data to accurately determine whether a change will adversely impact another service 101A-I. In some examples, the MLS 202 may notify the provider 201 that additional dependency data, additional schema definitions, etc., are required. In another example, the MLS 202 may determine based on change metrics 403 that there are several other concurrent changes occurring across the application system 100. For instance, change metrics 403 may also indicate that the average change is taking 30 days or longer to implement. In some examples, the MLS 202 may notify the provider 201 that the change will likely be delayed due to concurrent pending changes and/or the average time to deployment.

FIG. 5 depicts a flowchart diagram of an example method according to example aspects of the present disclosure. One or more portion(s) of the method 500 may be implemented by one or more computing devices such as, for example, the computing devices/systems described in FIGS. 3, 4, 5, etc. Moreover, one or more portion(s) of the method 500 may be implemented as an algorithm on the hardware components of the device(s) described herein. For example, a computing system may include one or more processors and one or more non-transitory, computer-readable media storing instructions that are executable by the one or more processors to cause the computing system to perform operations, the operations including one or more of the operations/portions of method 500. FIG. 5 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure.

In an embodiment, the method 500 may include a step 502 or otherwise begin by accessing schema data indicative of a change associated with a first system within a multi-system computing architecture, wherein executable code associated with the change is executable within a first computing environment. For instance, a provider 201 (e.g., first system) may propose a change to one or more interfaces in a first (e.g., sub-production) computing environment. The change to one or more interfaces may include software code changes to create, update, remove, or otherwise change an interface of a service 101A-I. The provider 201 may maintain a schema definitions data store 204 and a value reader configuration 211 data store where schema data (e.g. schema definitions) and value data (e.g., valid values) associated with the provider 201 may be stored.

When a change is proposed in the first (e.g., sub-production) computing environment, a schema monitor 208 within the MLS 202 may access schema data from the schema definitions data store 204. In some implementations, a value reader 205 within the MLS 202 may access value data from the value reader configuration data store 211. The schema definitions data store 204 may include schema definitions associated with the various computing environments where provider 201 instances are deployed. For example, the schema definitions data store 204 may include schema definitions associated with DEV, STG, QA, or other sub-production environments (e.g., first computing environment) where instances of the producer 201 may be deployed.

The MLS 202 may include a change detector 208 configured to read schema data from the schema monitor 208. The change detector 209 may be configured as a workflow which may be triggered automatically (e.g., scheduler, dynamically, etc.) or manually to process schema data to determine whether a change had been proposed for a respective schema definition for a service 101A-I. The change detector 209 may detect changes (e.g., code changes) based on a change in the schema definitions and/or valid values. The change may be proposed in any sub-production (e.g., first computing environment.

In an embodiment, the method 500 may include a step 504 or otherwise continue by determining, based on the schema data, a potential impact to a second system within the multi-system computing architecture, the potential impact arising from the change associated with the first system. For instance, the MLS 202 may include a dependency manager 207 configured to track and maintain dependencies for the producer. The dependency manager 207 may maintain dependencies at the interface level, system level, etc. In some examples, the dependency manager 207 may set up and direct and indirect dependencies for services 101A-I. For instance, the dependency manager 207 may identify direct dependencies based on dependency data provided by respective owners or custodians for services 101A-I, call tracing, or other techniques. Indirect dependencies may be identified by using a passthrough value reader configuration. For instance, values passed through (e.g., via fields from an original interface) to downstream services 101A-I (e.g., to fields on a downstream interface) may indicate indirect dependencies. The direct and indirect dependency data may be stored and maintained in the dependency manager 207.

The MLS 202 may analyze change data associated with a detected change by a first system from the change detector 209 and determine based on dependency data within the dependency manager 207 a potential impact for a second system (e.g., consumer 203). For instance, the MLS 202 may compare the change (e.g., interface change, system change, etc.) to the dependency data to determine other services 101A-I which will be directly or indirectly impacted by the change. In some examples, the multi-service launch system 202 may determine granular level changes based on the schema data and the value data. For instance, field level changes detected in a schema definition or values (e.g., passthrough values, etc.) within fields in a schema definition may be detected and compared against dependency data to determine potential granular level impacts to consumers 203.

In an embodiment, the method 500 may include a step 506 or otherwise continue by, based on the potential impact to the second system, generating (iii) one or more computing tasks to notify the second system of the change and (iv) an acknowledgment placeholder with a unique identifier associated the second system, the acknowledgement placeholder being stored within a data structure in association with the unique identifier. For instance, the MLS 202 may include a notification system 206 and an acknowledgment manager 210. The acknowledgement manager 210 may be configured to trigger the generation of an acknowledgement placeholder. An acknowledgement placeholder may include a record or file indicating a change which has a potential impact on one or more consumers 203.

For example, once the MLS 202 determines a potential impact to consumers 203, the change information along with dependency information may be passed to the acknowledgment manager 210. Based on this information, the acknowledgment manager 210 may begin a workflow to generate an acknowledgment placeholder with a unique identifier (id) for each dependent (e.g., directly dependent and indirectly dependent) service 101A-I. In some examples, the acknowledgment placeholder may include a status of an acknowledgment workflow using the unique ids. In some examples, the acknowledgment placeholder may be stored within a data structure in association with the unique identifier. For instance, the acknowledgment placeholders may be stored in local storage within the MLS 202.

The MLS 202 may generate one or more computing tasks to notify the consumers 203 of the change. The one or more computing tasks may include tasks for respective system owners or custodians of the consumers 203 (e.g., dependent services 101A-I) to test the proposed changes by the provider 201. For instance, the one or more computing tasks may include test scripts to be executed by consumers 203 to ensure that the proposed change will not have an adverse impact on the service 101A-I. Test scripts may indicate specific functionality or processes to be tested by the consumer 203. For example, a change that will split an API endpoint to more readily expose a component which has higher access requirements may be associated with a computing task (e.g., test script) which tests the functionality of the consumer 203 in a scenario where it must call the API slice endpoint.

In an embodiment, the method 500 may include a step 508 or otherwise continue by accessing, over a communication channel associated with the second system, data indicative of an execution status of the one or more computing tasks, wherein the data indicative of the execution status is associated with the unique identifier. For instance, as consumers 203 execute the one or more computing tasks (e.g., test scripts, etc.) consumers 203 may respond to an email notification, update a task in a project management tool, enter a status update in a messaging system, etc., to indicate an updated status on the computing tasks. In an example, implementation, the response to the notification (e.g., using the unique ids) may update the status of the acknowledgement placeholder.

In some examples, the MLS 202 may receive a response to the notification indicating one or more executed test scripts (e.g., executed computing tasks) from the consumer 203 (e.g., second system). The one or more executed test scripts may indicate test results associated with the potential impact of the change to the consumer 203. For instance, consumers 203 may test the change on their respective service 101A-I and determine there are no adverse impacts. As such, the executed tests scripts may indicate a "pass" execution status. In some examples, the consumer 203 may test the change and determine one or more changes local to the consumer 203 are required to avoid adverse impacts from the change. For example, the consumer 203 may implement one or more local changes and subsequently provide an executed test script indicating a "pass" execution status. In other examples, the one or more local changes may not be immediately implemented. As such the consumer 203 may provide an executed test script indicating a "failed" execution status.

In an embodiment, the method 500 may include a step 510 or otherwise continue by generating, based on the execution status and the unique identifier, an update to the data structure storing the acknowledgement placeholder, the update indicating that the one or more computing tasks have been executed by the second system. For instance, the MLS 202 may update, based on the id (e.g., identifying the acknowledgment placeholder) and the one or more executed test scripts, the execution status of the acknowledgement placeholder. The updated execution status of the acknowledgement placeholder in the storage system may trigger a progression of a workflow with the MLS 202. For instance, an updated execution status indicating all computing tasks have been successfully completed may indicate the provider 201 may proceed with the proposed change.

In an embodiment, the method 500 may include steps 512 and 514 or otherwise continue by, in response to the one or more computing tasks being executed by the second system, transmitting to the first system, data acknowledging the potential impact to the second system arising from the change associated with the first system. For instance, the acknowledgement manager 210 may be configured notify the provider 201 of any "failed" execution statuses for computing tasks. In some examples, the acknowledgement manager 210 may be configured to notify the provider once all computing tasks have a "pass" execution status for all computing tasks. A producer 201 notified that all computing tasks have been executed and have a "pass" execution status, may indicate that the change has been properly tested and will not have any adverse impacts on any dependent or downstream services 101A-I.

In an embodiment, the method 500 may include a steps 512 and 516 or otherwise continue by, in response to the one or more computing tasks being executed by the second system, transmitting one or more command instructions to deploy the executable code associated with the change from the first computing environment to a second computing environment. For instance, once the MLS 202 determines that all consumers 203 have been tested and acknowledge or approve the proposed change in a sub-production (e.g., first) computing environment, the MLS 202 may trigger one or more sub-production branches (e.g., in the source code repository 304) associated with the change to merge with a main or master (e.g., production) branch. By merging the changes from a sub-production branch to a main or master branch, the change may be promoted (e.g., deployed) from the first (e.g., sub-production) computing environment to a second (e.g., production) computing environment. In some examples, the one or more command instructions may trigger a CI/CD pipeline to perform a final test and deploy the changes in a production (e.g., second) computing environment.

Figure 6:
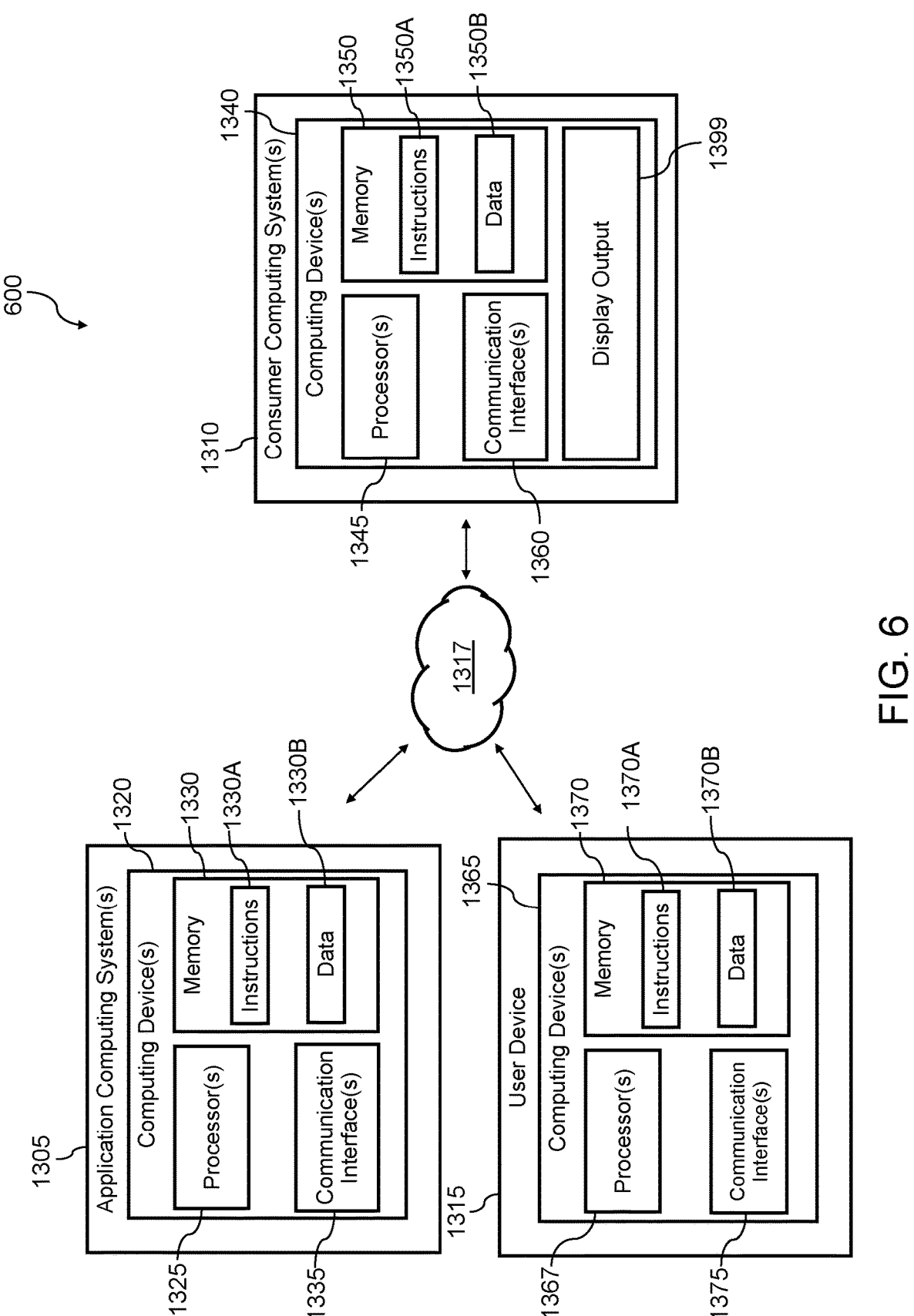
FIG. 6 depicts an example computing ecosystem according to example aspects of the present disclosure.

FIG. 6 depicts a block diagram of an example system 600 for implementing systems and methods according to example embodiments of the present disclosure. The example system 600 illustrated in FIG. 6 is provided as an example only. The components, systems, connections, and/or other aspects illustrated in FIG. 600 are optional and are provided as examples of what is possible, but not required, to implement the present disclosure. The example system 600 may include an application computing system 1305 (e.g., that is associated with an application system 100, service 101A-I etc.). The example system 600 may include a consumer computing system 1310 (e.g., that is associated with impacted systems of the change, etc.). The example system 600 may include a remote computing device 1315 (e.g., client devices, etc.). One or more of the application computing system 1305, the consumer computing system 1310, or the remote computing system 1315 may be communicatively coupled to one another over one or more communication network(s) 1317. The networks 1317 may correspond to any of the networks described herein.

The computing device(s) 1320 of the application computing system 1305 may include processor(s) 1325 and a memory 1330. The one or more processors 1325 may be any suitable processing device (e.g., a processor core, a microprocessor, an ASIC, a FPGA, a controller, a microcontroller, etc.) and may be one processor or a plurality of processors that are operatively connected. The memory 1330 may include one or more non-transitory computer-readable storage media, such as RAM, ROM, EEPROM, EPROM, one or more memory devices, flash memory devices, data registrar, etc., and combinations thereof.

The memory 1330 may store information that may be accessed by the one or more processors 1325. For example, the memory 1330 (e.g., one or more non-transitory computer-readable storage mediums, memory devices, etc.) may include computer-readable instructions 1330A that may be executed by the one or more processors 1325. The instructions 1330A may be software written in any suitable programming language or may be implemented in hardware. Additionally, or alternatively, the instructions 1330A may be executed in logically and/or virtually separate threads on processor(s) 1325.

For example, the memory 1330 may store instructions 1330A that when executed by the one or more processors 1325 cause the one or more processors 1325 (e.g., of the application computing system 1305, etc.) to perform operations such as any of the operations and functions of the computing system(s) described herein (or for which the system(s) are configured), one or more of the operations and functions for communicating between the computing systems, one or more portions/operations of method 500, and/or one or more of the other operations and functions of the computing systems described herein.

The memory 1330 may store data 1330B that may be obtained (e.g., acquired, received, retrieved, accessed, created, stored, etc.). The data 1330B may include, for example, any of the data/information described herein. In some implementations, the computing device(s) 1320 may obtain data from one or more memories that are remote from the application computing system 1305.

The computing device(s) 1320 may also include a communication interface 1335 used to communicate with one or more other system(s) remote from the application computing system 1305, such as the consumer computing system 1310, and/or remote computing system 1315. The communication interface 1335 may include any circuits, components, software, etc. for communicating via one or more networks (e.g., network(s) 1317, etc.). The communication interface 1335 may include, for example, one or more of a communications controller, receiver, transceiver, transmitter, port, conductors, software and/or hardware for communicating data.

The consumer computing system 1310 may include one or more computing device(s) 1340 that are remote from the application computing system 1305, and the remote computing system 1315. The computing device(s) 1340 may include one or more processors 1345 and a memory 1350. The one or more processors 1345 may be any suitable processing device (e.g., a processor core, a microprocessor, an ASIC, a FPGA, a controller, a microcontroller, etc.) and may be one processor or a plurality of processors that are operatively connected. The memory 1350 may include one or more tangible, non-transitory computer-readable storage media, such as RAM, ROM, EEPROM, EPROM, one or more memory devices, flash memory devices, data registrar, etc., and combinations thereof.

The memory 1350 may store information that may be accessed by the one or more processors 1345. For example, the memory 1350 (e.g., one or more tangible, non-transitory computer-readable storage media, one or more memory devices, etc.) may include computer-readable instructions 1350A that may be executed by the one or more processors 1345. The instructions 1350A may be software written in any suitable programming language or may be implemented in hardware. Additionally, or alternatively, the instructions 1350A may be executed in logically and/or virtually separate threads on processor(s) 1345.

For example, the memory 1350 may store instructions 1350A that when executed by the one or more processors 1345 cause the one or more processors 1345 to perform operations such as any of the operations and functions of the computing system(s) described herein (or for which the system(s) are configured), one or more of the operations and functions for communicating between computing systems, one or more portions/operations of method 600 and/or one or more of the other operations and functions of the computing systems described herein. The memory 1350 may store data 1350B that may be obtained. The data 1350B may include, for example, any of the data/information described herein.

The computing device(s) 1340 may also include a communication interface 1360 used to communicate with one or more system(s) that are remote from the consumer computing system 1310. The communication interface 1360 may include any circuits, components, software, etc. for communicating via one or more networks (e.g., network(s) 1317, etc.). The communication interface 1360 may include, for example, one or more of a communications controller, receiver, transceiver, transmitter, port, conductors, software and/or hardware for communicating data.

The remote computing system 1315 may include one or more computing device(s) 1365 that are remote from the application computing system 1305, and the consumer computing system 1310. The computing device(s) 1365 may include one or more processors 1367 and a memory 1370. The one or more processors 1370 may be any suitable processing device (e.g., a processor core, a microprocessor, an ASIC, a FPGA, a controller, a microcontroller, etc.) and may be one processor or a plurality of processors that are operatively connected. The memory 1370 may include one or more tangible, non-transitory computer-readable storage media, such as RAM, ROM, EEPROM, EPROM, one or more memory devices, flash memory devices, data registrar, etc., and combinations thereof.

The memory 1370 may store information that may be accessed by the one or more processors 1367. For example, the memory 1370 (e.g., one or more tangible, non-transitory computer-readable storage media, one or more memory devices, etc.) may include computer-readable instructions 1370A that may be executed by the one or more processors 1367. The instructions 1370A may be software written in any suitable programming language or may be implemented in hardware. Additionally, or alternatively, the instructions 1370A may be executed in logically and/or virtually separate threads on processor(s) 1367.

For example, the memory 1370 may store instructions 1370A that when executed by the one or more processors 1367 cause the one or more processors 1367 to perform operations such as any of the operations and functions of the computing system(s) (e.g., user devices, etc.) described herein (or for which the user device(s) are configured), one or more of the operations and functions for communicating between systems, one or more portions/operations of method 600 and/or one or more of the other operations and functions of the computing systems described herein. The memory 1370 may store data 1370B that may be obtained. The data 1370B may include, for example, any of the data/information described herein.

The computing device(s) 1365 may also include a communication interface 1375 used to communicate computing device/system that is remote from the remote computing system 1315, such as consumer computing system 1310 or application computing system 1305. The communication interface 1375 may include any circuits, components, software, etc. for communicating via one or more networks (e.g., network(s) 1317, etc.). The communication interface 1375 may include, for example, one or more of a communications controller, receiver, transceiver, transmitter, port, conductors, software and/or hardware for communicating data.

The remote computing system 1315 may include a display output 1399. The display output 1399 may be any type of display including, for example, a liquid crystal display (LCD), liquid emitting diode display (LED), organic light emitting diode (OLED), plasma monitor, cathode ray tube (CRT), display screen, monitor, television, or any other suitable display device.

The network(s) 1317 may be any type of network or combination of networks that allows for communication between devices. In some implementations, the network(s) 1317 may include one or more of a local area network, wide area network, the Internet, secure network, cellular network, mesh network, peer-to-peer communication link and/or some combination thereof and may include any number of wired or wireless links. Communication over the network(s) 1317 may be accomplished, for example, via a communication interface using any type of protocol, protection scheme, encoding, format, packaging, etc.

Computing tasks discussed herein as being performed at certain computing device(s)/systems may instead be performed at another computing device/system, or vice versa. Such configurations may be implemented without deviating from the scope of the present disclosure. The use of computer-based systems allows for a great variety of possible configurations, combinations, and divisions of tasks and functionality between and among components. Computer-implemented operations may be performed on a single component or across multiple components. Computer-implemented tasks or operations may be performed sequentially or in parallel. Data and instructions may be stored in a single memory device or across multiple memory devices.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims discussed herein may be adapted, rearranged, expanded, omitted, combined, or modified in various ways without deviating from the scope of the present disclosure.

Some implementations are described with a reference numeral, for example illustrated purposes and are not meant to be limiting.

What is claimed is:

1. A computer-implemented method comprising:
obtaining schema data indicative of a change associated with a first system within a multi-system computing architecture, wherein executable code associated with the change is executable within a first computing environment;
computing, based on the schema data, a potential impact to a second system within the multi-system computing architecture, the potential impact arising from the change associated with the first system;
based on the potential impact to the second system, generating an acknowledgment placeholder with a unique identifier associated with the second system, wherein the acknowledgement placeholder is associated with one or more computing tasks to cause the second system to perform at least one test associated with the change to satisfy the acknowledgement placeholder;
obtaining, over a communication channel associated with the second system, data indicative of an execution status of the one or more computing tasks;
computing, based on the execution status and the unique identifier, an update to a data structure storing the acknowledgement placeholder, the update indicating that the at least one test satisfies the acknowledgement placeholder;
in response to the update to the data structure, transmitting to the first system, first data indicating an acknowledgement of the potential impact by the second system and second data satisfying the acknowledgement placeholder; and
based on the first data and the second data, deploying the executable code associated with the change in a second computing environment.

2. The computer-implemented method of claim 1, wherein the first computing environment is associated with a test environment and the second computing environment is associated with a production environment.

3. The computer-implemented method of claim 1, further comprising:
generating a request executable by a remote computing system, the request indicative of the change to be deployed in the second computing environment; and
transmitting, the request to the remote computing system.

4. The computer-implemented method of claim 1, wherein determining a potential impact to the second system comprises:
accessing value data associated with one or more fields of a schema; and
determining, based on the value data, one or more dependencies between the first system and the second system.

5. The computer-implemented method of claim 4, further comprising storing the one or more dependencies in a storage system.

6. The computer-implemented method of claim 4, wherein the one or more dependencies comprise at least one of direct dependencies or indirect dependencies.

7. The computer-implemented method of claim 1, wherein the change associated with the first system comprises at least one of:
(i) a service addition or service removal,
(ii) an RPC (remote procedure call) addition or removal,
(iii) a schema field addition or removal, or
(iv) a field value addition or removal.

8. The computer-implemented method of claim 1, further comprising outputting the one or more computing tasks to the second system.

9. The computer-implemented method of claim 1, wherein the change comprises one or more interface changes associated with the first system.

10. The computer-implemented method of claim 1, wherein the one or more computing tasks comprise one or more test scripts executable by the second system.

11. The computer-implemented method of claim 10, further comprising:

receiving one or more executed test scripts from the second system, wherein:

the one or more executed test scripts are associated with the one or more computing tasks, and the one or more executed test scripts are indicative of test results associated with the potential impact of the change to the second system.

12. The computer-implemented method of claim 10, further comprising:

updating, based on the one or more executed test scripts, the execution status of the one or more computing tasks.

13. The computer-implemented method of claim 1, comprising:

determining, based on the schema data, a potential impact to a third system within the multi-system computing architecture;

based on the potential impact to the third system, generating a computing task to notify the third system of the change and another acknowledgement placeholder with another unique identifier associated with the third system, the other acknowledgement placeholder being stored within the data structure in association with the other unique identifier;

accessing, over another communication channel associated with the third system, the data indicative of the execution status of the computing task associated with the third system, wherein the data indicative of the execution status is associated with the other unique identifier associated with the third system; and generating, based on the execution status and the unique identifier, another update to the data structure storing the other acknowledgement placeholder, the other update indicating that the computing task has been executed by the third system.

14. The computer-implemented method of claim 13, further comprising in response to the computing task being executed by the third system, outputting data acknowledging the potential impact to the third system arising from the change associated with the first system.

15. A computing system comprising:

one or more processors; and one or more memory resources storing instructions executable by the one or more processors to cause the one or more processors to perform operations, the operations comprising:

obtaining schema data indicative of a change associated with a first system within a multi-system computing architecture, wherein executable code associated with the change is executable within a first computing environment:

computing, based on the schema data, a potential impact to a second system within the multi-system computing architecture, the potential impact arising from the change associated with the first system;

based on the potential impact to the second system, generating an acknowledgment placeholder with a unique identifier associated with the second system, wherein the acknowledgement placeholder is associated with one or more computing tasks to cause the second system to perform at least one test associated with the change to satisfy the acknowledgement placeholder;

obtaining, over a communication channel associated with the second system, data indicative of an execution status of the one or more computing tasks;

computing, based on the execution status and the unique identifier, an update to a data structure storing the acknowledgement placeholder, the update indicating that the at least one test satisfies the acknowledgement placeholder;

in response to the update to the data structure, transmitting: to the first system, first data indicating an acknowledgement of the potential impact by the second system and second data satisfying the acknowledgement placeholder;

based on the first data and the second data, deploying the executable code associated with the change in a second computing environment.

16. The computing system of claim 15, wherein the first computing environment is associated with a test environment and the second computing environment is associated with a production environment.

17. The computing system of claim 15, wherein the operations further comprise:

generating a request executable by a remote computing system, the request indicative of the change to be deployed in the second computing environment; and transmitting, the request to the remote computing system.

18. The computing system of claim 15, wherein determining a potential impact to the second system comprises:

accessing value data associated with one or more fields of a schema; and determining, based on the value data, one or more dependencies between the first system and the second system.

19. The computing system of claim 18, wherein the operations further comprise storing the one or more dependencies in a storage system.

20. A non-transitory computer-readable medium storing instructions that are executable by one or more processors to cause the one or more processors to perform operations, the operations comprising:

obtaining schema data indicative of a change associated with a first system within a multi-system computing architecture, wherein executable code associated with the change is executable within a first computing environment;

computing, based on the schema data, a potential impact to a second system within the multi-system computing architecture, the potential impact arising from the change associated with the first system;

based on the potential impact to the second system, generating an acknowledgment placeholder with a unique identifier associated with the second system, wherein the acknowledgement placeholder is associated with one or more computing tasks to cause the second system to perform at least one test associated with the change to satisfy the acknowledgement placeholder;

obtaining, over a communication channel associated with the second system, data indicative of an execution status of the one or more computing tasks;

computing, based on the execution status and the unique identifier, an update to a data structure storing the acknowledgement placeholder, the update indicating that the at least one test satisfies the acknowledgement placeholder;

in response to the update to the data structure, transmitting to the first system, first data indicating an acknowledgement of the potential impact by the second system and second data satisfying the acknowledgement placeholder;

based on the first data and the second data, deploying the executable code associated with the change in a second computing environment.

\* \* \* \* \*